United States Patent [19]

Tano et al.

[11] Patent Number: 4,557,575
[45] Date of Patent: Dec. 10, 1985

[54] PHOTOGRAPHING MODE DISPLAY SWITCHING CIRCUIT

[75] Inventors: Eiichi Tano; Takeo Kobayashi; Kiyoshi Negishi, all of Tokyo, Japan

[73] Assignee: Asahi Kogaku Kogyo Kabushiki Kaisha, Tokyo, Japan

[21] Appl. No.: 587,789

[22] Filed: Mar. 9, 1984

[30] Foreign Application Priority Data

Mar. 12, 1983 [JP] Japan ............................ 58-34905[U]

[51] Int. Cl.$^4$ .............................................. G03B 7/097
[52] U.S. Cl. ................................. 354/289.1; 354/465
[58] Field of Search ........... 354/289.1, 289.11, 289.12, 354/441–445, 412, 465, 467, 468, 471–475, 484; 307/241, 247 R, 510

[56] References Cited

U.S. PATENT DOCUMENTS 4,344,681  8/1982  Yamada ................................ 354/442
4,479,065 10/1984  Aizawa ........................... 307/247 R Primary Examiner—L. T. Hix
Assistant Examiner—David M. Gray
Attorney, Agent, or Firm—Sughrue, Mion, Zinn, Macpeak & Seas

[57] ABSTRACT

A photographing mode selecting circuit for a camera having a very low power consumption. A mechanical switch is provided for each possible photographing mode of the camera. Each mechanical switch is coupled in series with a resistor and an analog switch between the power source terminals. The analog switches are periodically pulsed to close them, thereby allowing current to flow through the corresponding resistor and mechanical switch if the mechanical switch is closed. The outputs formed at the junctions between the analog switches and the resistors are applied to flip-flop circuits for storage.

3 Claims, 4 Drawing Figures

PHOTOGRAPHING MODE DISPLAY SWITCHING CIRCUIT

BACKGROUND OF THE INVENTION

The present invention relates to a photographing mode display switching circuit for a camera in which mechanical switches operating in association with the shutter dial, the apperture ring and the shutter speed setting push bottom are operated to select among various photographing mode displays.

In general, the states of use of the electronic circuitry in a camera can be divided into a photometric state and a control state. The term "photometric state" as used herein is intended to mean a state in which photometric parameters, such as the viewed object's brightness, film sensitivity, aperture value and shutter speed, are calculated with the photometric switch closed. The term "control state" as used here is intended to mean a state in which the aperture or the shutter is controlled during the release operation.

Recently, electronic circuitry for cameras has been remarkably digitized. The clock pulse generating source for such circuitry employs a crystal. However, because considerable time is required for the oscillation of a crystal to stabilize, the oscillation circuit must be in operation at all times. The amount of current required by the circuit in the standby state is generally on the order of several microamperes.

The conventional electronic circuit for a camera is constructed as shown in FIGS. 1 and 2. In FIG. 1, reference character E designates a battery for supplying current to a first circuit block A. A clock pulse generating crystal CR is connected to the first circuit block A. The first circuit block A has connected thereto a plurality of mechanical switches $S_1, S_2, \ldots$ and $S_n$ on its input side, each having one terminal connected to ground, and an extremely low power consumption type display element, which may for instance be a liquid crystal display element. The battery is connected through a photometric switch MS to a second circuit block B. The first and second circuit blocks A and B are connected together through signal lines DB-A and DB-B. Signals from the first circuit block A are transmitted to the second circuit block B through the signal line DB-A. Signals from the second circuit block B are transmitted through the signal line DB-B to the first circuit block A.

The first circuit block A is employed to monitor the states of the mechanical switches $S_1$ through $S_n$ and to display the monitored states on the display element DP. The mechanical switches $S_1$ through $S_n$ are operated in association with the operations of the shutter dial, the aperture ring, a push button used for setting the shutter speed, etc. The states of the switches $S_1$ through $S_n$ select among various photographing modes, such as a shutter priority mode, an aperture priority mode and a manual mode, and an indication of the selected mode is displayed on the display element DP at all times. If a mechanical switch is provided which is operated in association with the shutter speed setting push button, when selecting the shutter priority mode or the manual priority mode, the photographer can set the shutter speed while observing the display element DP with the photometric switch MS maintained open.

The photographing mode and the setting of the shutter speed are applied from the first circuit block A through the signal line DB-A to the second circuit block B. Upon closure of the photometric switch MS, the second circuit block receives the data from the first circuit block needed to perform the photometric calculations. When necessary, the results of such calculations are applied through the signal line DB-B to the first circuit block A and displayed on the display element DP.

The first circuit block A is shown in FIG. 2 in more detail. The mechanical switches $S_1$ through $S_n$ are connected in series with resistors $r_1$ through $r_n$, respectively. The output signals of the switches at the junction points of the switches and the resistors are applied to a logic operation circuit LC. The series circits of the switches and the resistors are connected between the positive terminal $V_{DD}$ and the negative terminal GND of the battery E.

A specific example of the conventional circuit will now be discussed. If the voltage of the battery E is 3 V, the number n of mechanical switches is five, and the resistance of each of the resistors $r_1$ through $r_n$ is 1 megohm, the magnitude of the current flowing in a closed mechanical switch is 3 $\mu$A. Accordingly, if all five of the switches are closed, the total of the currents flowing in these switches is 15 $\mu$A, a sufficiently high value that the battery will be consumed quite rapidly.

Thus, in the conventional circuit, the life of the battery is unavoidably short, even if the resistances of the resistors $r_1$ through $r_n$ are set to an unpractical value of the order of several megohms.

SUMMARY OF THE INVENTION

In view of the foregoing, the invention provides a photographing mode display switching circuit for a camera in which mechanical switches are combined with analog switches controlled by a clock pulse generator, whereby the amount of current flowing when a mechanical switch is operated to select a desired photographing mode is reduced, thereby increasing the expected lifetime of the battery.

DESCRIPTION OF THE PREFERRED EMBODIMENTS

Figure 1:
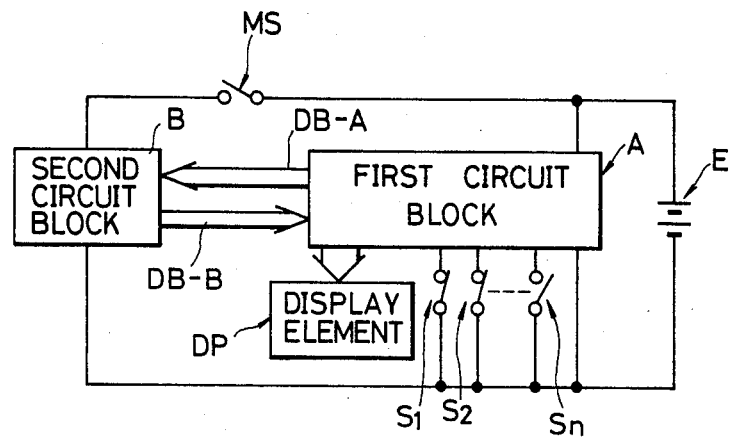
FIG. 1 is a circuit diagram, partly as a block diagram, showing essential parts of a conventional electronic circuit for a camera.
Figure 2:
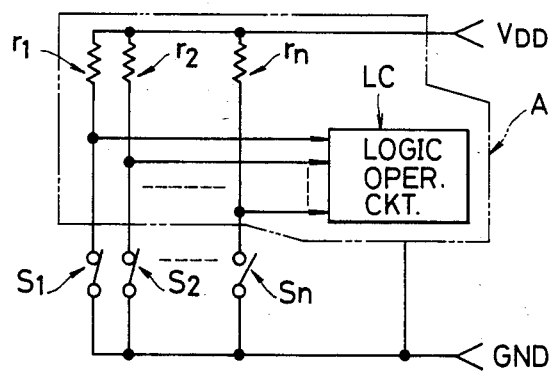
FIG. 2 is a circuit diagram showing the essential parts of a conventional photographing mode display switching circuit.

A preferred embodiment of the invention will now be described with reference to FIGS. 3 and 4. In these figures, those components which have been described with reference to FIGS. 1 and 2 are designated by the same reference numerals or characters.

Figure 3:
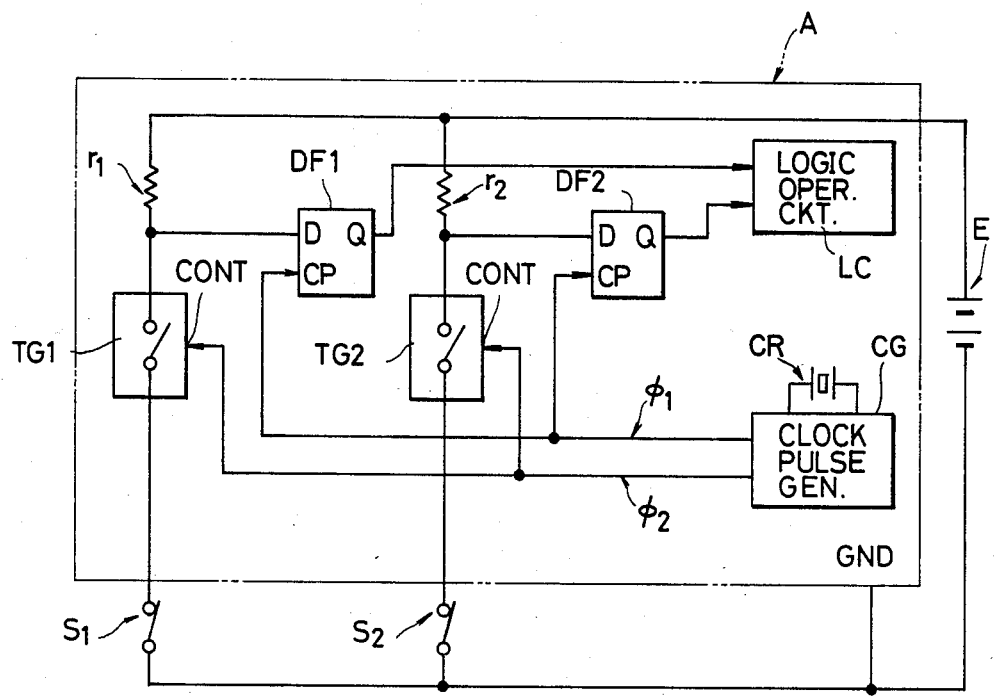
FIG. 3 is a circuit diagram showing the essential parts of a photographing mode display switching circuit according to the invention.
Figure 4:
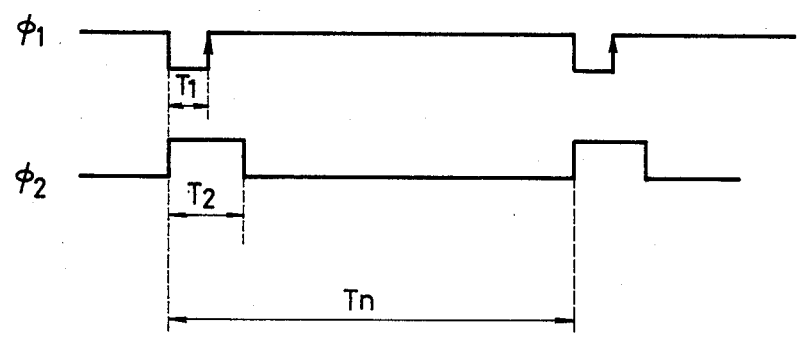
FIG. 4 is a timing chart used for a description of the output pulses of a clock pulse generator.

FIG. 3 shows a first circuit block A which has only two mechanical switches $S_1$ and $S_2$ for the purpose of providing a simplified description. In FIG. 3, TG1 and TG2 designate analog switches which are connected between the mechanical switches $S_1$ and $S_2$ and the resistors $r_1$ and $r_2$, respectively. Further in FIG. 3, reference character CG designates a clock pulse generator which generates first and second pulse signals $\phi_1$ and $\phi_2$. Each of the analog switches TG1 and TG2 is operated (closed) upon reception of the clock pulse signal $\phi_2$ on its control terminal CONT. Input signals are supplied from the junction points of the analog switches TG1 and TG2 and the resistors $r_1$ and $r_2$ to terminal D of positive edge triggered flip-flops DF1 and DF2, respectively. The first pulse signal $\phi_1$ of the clock pulse generator CG is applied to the clock pulse terminals CP of the flip-flops DF1 and DF2. Signals provided at the output terminals Q of the flip-flops are applied to the logic operation circuit LC.

With the first circuit block A constructed as described above, each of the analog switches TG1 and TG2 is closed for a pulse width $T_2$ every period $T_n$ of the pulse signal $\phi_2$. If it is assumed that a relation $T_1=T_2/2$ is present between the pulse width $T_2$ of the second pulse signal $\phi_2$ and the pulse width $T_1$ of the first pulse signal $\phi_1$, then the flip-flops DF1 and DF2 latch the input data only when the analog switches TG1 and TG2 are closed. In other words, when the mechanical switches $S_1$ and $S_2$ are in the closed state, currents of predetermined magnitudes flow in the resistors $r_1$ and $r_2$ for the period of time $T_2$, and the flip-flops DF1 and DF2 latch logical states "0". On the other hand, when the mechanical switches $S_1$ and $S_2$ are open, no current flows in the resistors $r_1$ and $r_2$, and therefore the flip-flops DF1 and DF2 latch logical states "1".

As is apparent from the above description, even when the mechanical switches $S_1$ and $S_2$ are maintained closed, the period of time for which currents flow in the resistors $r_1$ and $r_2$ is $T_2/T_n$. Therefore, generally the current consumption is reduced to $T_2/T_n$ of that in the conventional circuit. For instance, where the period $T_n$ is 125 ms and the pulse width $T_2$ is 125 $\mu$s, the open and closed states of the mechanical switches $S_1$ and $S_2$ can be observed at intervals of eight times per second, and hence the current consumption of the battery E is reduced to 1/1000 of that in the conventional circuit in which current is continuously supplied to the resistors $r_1$ and $r_2$.

The circuit according to the invention is obtained by adding the analog switches TG1 and TG2, the flip-flops DF1 and DF2, and the clock pulse generator CG to the conventional circuit. Therefore, it is necessary to take into consideration the currents which are consumed by these additional components. However, the increment of current, that is, the amount of current required by the additional components, can be substantially disregarded because the current consumption of the whole first circuit block A is reduced.

In the above-described embodiment, one terminal of each of the resistors $r_1$ and $r_2$ is connected to the positive terminal of the battery E and one terminal of each of the mechanical switches $S_1$ and $S_2$ is connected to the negative terminal of the battery E. However, it goes without saying that the circuit may be so modified that one terminal of each of the resistors is connected to the negative terminal of the battery E and one terminal of each of the mechanical switches is connected to the positive terminal of the battery E.

As is apparent from the above description, according to the invention, analog switches controlled by the clock pulse generator are operated to make connection between the resistors and respective ones of the mechanical switches to select the photographing mode in accordance with the states of the mechanical switches. Accordingly, the rate of consumption of the battery is minimized.

We claim:

1. An electronic mode control circuit for a camera, comprising:
   a plurality of mechanical switches, one of said mechanical switches being provided for each photographing mode of said camera, each of said mechanical switches having a first terminal coupled to a first terminal of a DC power source;
   a plurality of resistors, one of said resistors being provided for each of said mechanical switches, each of said resistors having a first terminal coupled to a second terminal of said DC power source;
   a plurality of analog switches, one of said analog switches being provided for each of said mechanical switches, each of said analog switches having a first signal terminal coupled to a second terminal of a respective one of said switches and a second signal terminal coupled to a second terminal of a respective one of said resistors;
   a plurality of flip-flops, one of said flip-flops being provided for each of said mechanical switches, each of said flip-flops having a signal input coupled to said second terminal of a respective one of said resistors; and
   means for applying clock pulses to control terminals of said analog switches and to clock pulse inputs of said flip-flops.

2. The mode selecting circuit of claim 1, wherein all control inputs of said analog switches are coupled to a first output terminal of said clock pulse generating means, and all clock input terminals of said flip-flops are coupled to a second terminal of said clock pluse generating means, clock pulses produced by said clock pulse generating means on said second terminal having leading edges occurring substantially simultaneously with leading edges of clock pulses applied to said first terminal, and trailing edges of said clock pulses applied to said second terminal occurring earlier than trailing edges of said clock pulses applied to said first terminal.

3. The mode selecting circuit of claim 1, wherein a width of said pulses applied to said first terminal is approximately twice the width of said pulses applied to said second terminal.

* * * * *